Inventor:
HANS JURGEN MATTHIES
by Mestern & Kollin
ATTORNEYS

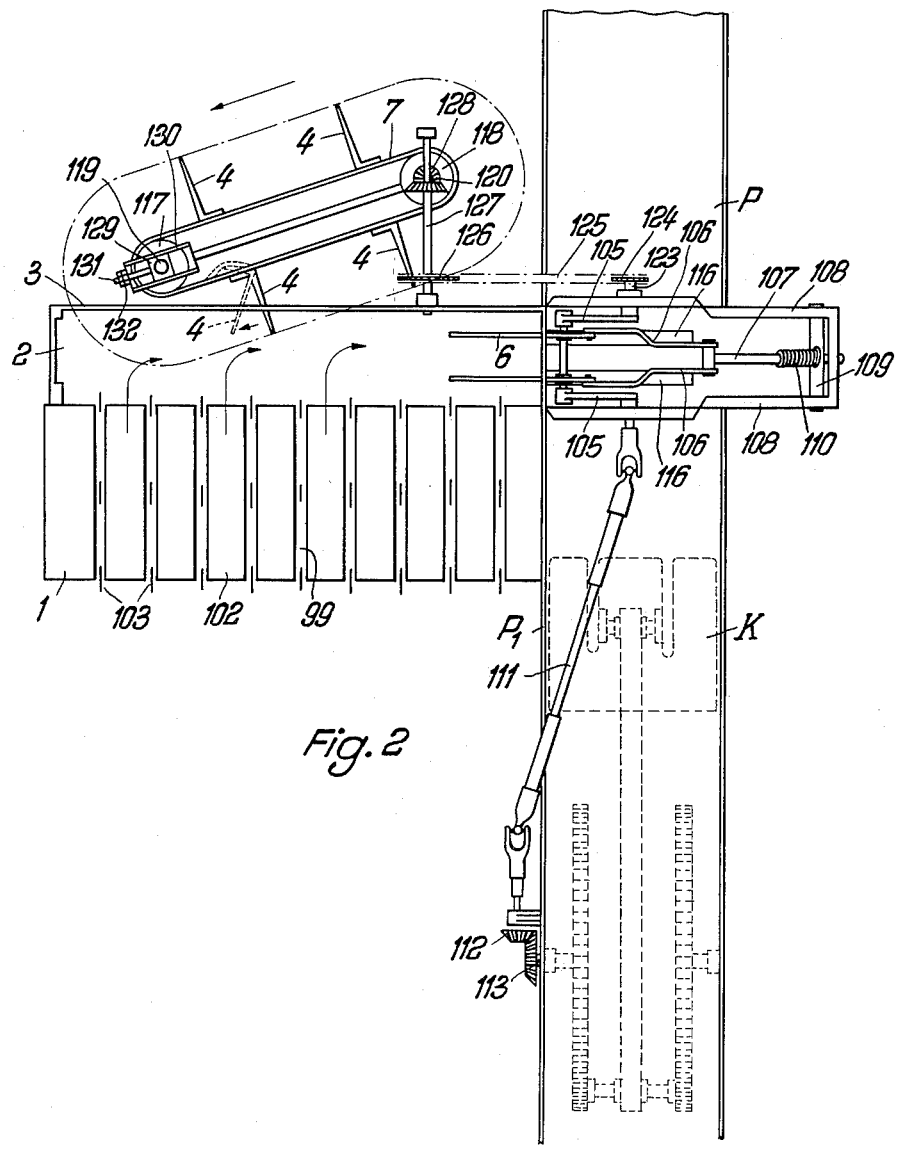

United States Patent Office 2,975,581
Patented Mar. 21, 1961

2,975,581
PICK-UP BALER WITH CROSS CONVEYER

Hans Jürgen Matthies, Braunschweig-Lehndorf, Germany, assignor to Gebrüder Welger, Maschinenfabrik, Wolfenbuttel, Germany Filed May 8, 1957, Ser. No. 657,903

Claims priority, application Germany Sept. 25, 1956

1 Claim. (Cl. 56—341)

The present invention relates to a cross conveyer for pick-up balers, more particularly such balers having a baling chamber which extends along the pick-up unit longitudinally in the direction of travel. This baler is of the type having an accumulating table which connects the pick-up unit with a lateral feed opening in the baling chamber; the baler is also provided with packer members which by the action of the conveyer move the crop material lifted onto the table along the same into the baling chamber and in front of a plunger.

In the known pick-up balers of the type mentioned above, it has been suggested to arrange e.g. a number of spaced feed fingers on a gear drive, such as described in U.S. Patent No. 2,760,625, or to provide a cross conveyer having an endless chain drive with feed elements, as in U.S. Patent 2,714,441. These conveyers feed the crop material over the entire length of the accumulating table through said lateral feed opening into the baling chamber and in front of a reciprocating plunger provided for compression of said material. By means of the feed fingers, a web of crop material is moved stepwise from finger to finger into the baling chamber. The formed web of material has to be loosened and divided into small pieces by means of a cutter fastened to the plunger and cooperating with a blade secured to the lateral feed opening of the baling chamber; this operation requires considerable input of energy.

The feed fingers of an endless chain conveyer, on the other hand, are capable of feeding the crop material in one sweep without interruption over the entire width of the table into the baling chamber and in front of the plunger. The necessary energy for the cutter operation is reduced in that manner. However, the manufacture of such chain conveyers is quite expensive. This is caused by the fact that, while comparatively small forces are required for moving the loose crop material over the table to the feed opening of the baling chamber, large forces are needed for pushing the material through the feed opening into the baling chamber and in front of the plunger, since a very high compression is to be accomplished at this time. A chain conveyer capable of moving the crop materal not only along the accumulating table, but also of pushing it through the feed opening of the baling chamber to the plunger, has to be so dimensioned that it will be able to withstand the high stress caused during the latter step of the operation. This, then, incurs considerable cost in the manufacture of the conveyer unit.

For that reason, two separate feed mechanisms were used in the cross conveyers for pick-up balers of the type described, one of said mechanisms to serve for moving the crop material lifted by the pick-up unit onto the table over the latter to a position close to the lateral feed-in opening of the baling chamber, the other mechanism to move the material through the opening into the baling chamber and into the position in front of the plunger, while the latter is on its return stroke and leaves the entire opening free.

In the last-mentioned mechanism packer fingers are positioned at the top of the baler chamber above the lateral feed-in opening and moving into slots of the top wall of the baling chamber from a position in front of the lateral feed-in opening and back through the slots, out of the chamber, to return to the starting position (see U.S. Patent 2,450,082). As a cross conveyer for moving the crop material along the accumulating table to the lateral feed-in opening the known pick-up balers of the mentioned type use e.g. an auger floatingly arranged above the crop material. However, the auger has the tendency of winding moist material around its shaft and is not always reliable to grip jammed parts.

Also known are endless chain conveyers with feed fingers journalled to the chain and positioned vertically with respect to the table platform, which move the crop material over the platform to the lateral feed-in opening. These fingers, too, are not dependable to grip jammed goods, since the driving pressure of the pick-up unit presses the crop material laterally against the feed fingers and the weight of the loose crop material is not sufficient for pressing it down onto the fingers.

It is the object of the present invention to provide cross-conveyers for pick-up balers which permit to overcome the above described shortcomings of the known units and which are dependable in operation without incurring high expenses for manufacture and maintenance.

According to the invention the principle of using two separate mechanisms as cross-conveyers for the balers is maintained, one of the conveyer mechanisms making use of the packer fingers above described which move through open slots in the top of the baler chamber in a curved path.

The invention is based on the discovery that the pressure which is exerted by the pick-up unit on the crop material, may well be utilized for pressing the material onto the feed fingers of a cross conveyer, when the pressure is made to act against a vertical wall forming a dam, from which the fingers of the cross conveyer, arranged behind said wall for movement on vertical axes, are adapted to reach out over the table and feed the crop material toward the inlet opening of the baling chamber where it is taken up by said packer fingers.

With this end in mind, the accumulating table for the crop material is provided, according to the present invention, with a vertical back wall, opposite the pick-up unit, said wall extending over the full length of the table and being positioned adjacent to a vertical edge of the feed-in opening in a side wall of the baling chamber; also provided are conveyer members arranged behind said wall, movable around vertical axes, said members having fingers capable of moving from a position behind the wall through slots into a position in front of the wall and along the same toward the feed-in opening and shortly before reaching the opening returning into starting position behind the wall.

In a preferred embodiment of the machine according to the invention, the cross conveyer comprises an endless belt mounted on vertical rollers; to the belt, feed fingers are rigidly attached in pairs; the belt is obliquely arranged with respect to the back wall, which has horizontal slots through which the feed fingers project over a substantial width of the table on the far side thereof with respect to the feed-in opening of the baling chamber whereas they become gradually retracted behind the back wall as they approach the feed-in opening.

The fingers need not be directed for retraction behind the vertical wall since this will occur automatically.

Since the speed of the cross conveyers is quite independent from the stroke of the reciprocating plunger in the baling chamber it is possible to use endless belts of leather, rubber, or other resilient material. This involves the advantage that fingers of unyielding material may be fastened rigidly to such belts, which fingers will yet be capable of giving way when an obstacle is met, since the resilience of the conveyer belts will permit such yielding movements.

The invention will now be more fully described by way of example with reference to the accompanying drawings but it should be understood that these are given by way of illustration and not of limitation and that many changes in the details can be made without departing from the spirit of the invention.

In the drawings:

Fig. 2 shows part of the machine in plan view.

Figure 1:
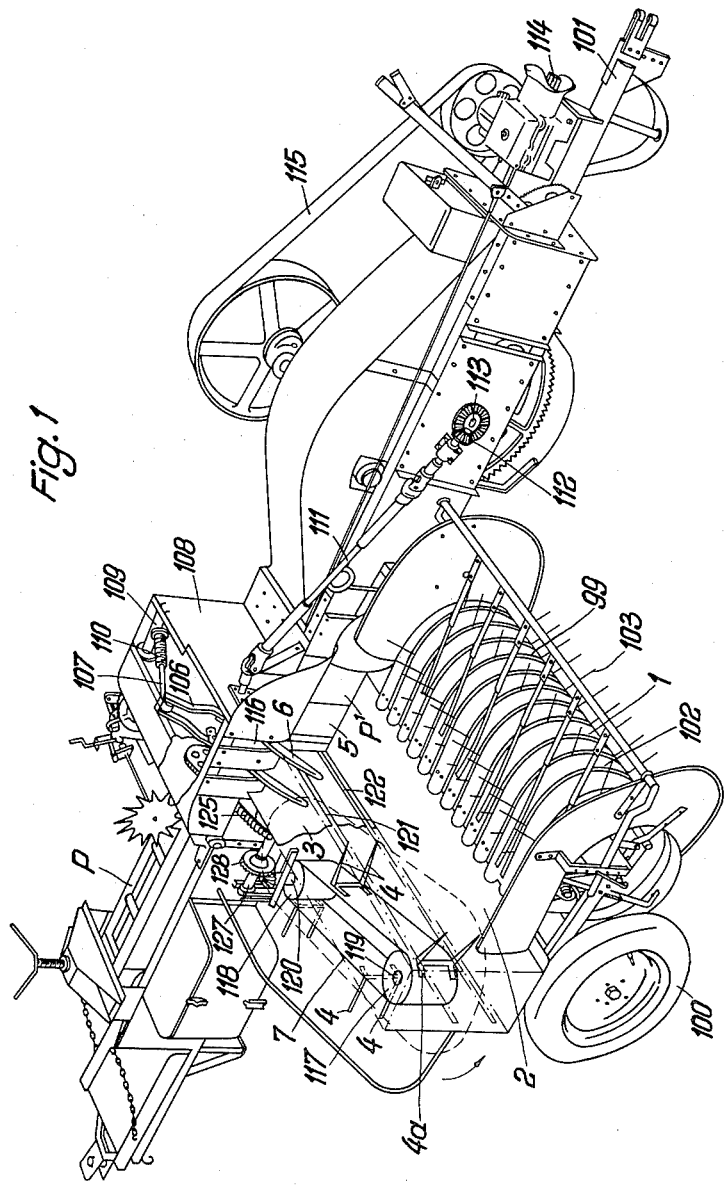
Fig. 1 illustrates the machine according to the invention in a perspective view.

Referring now to Fig. 1, the pick-up unit is designated by 1 and the baler unit by P; both units are mounted on a frame F movable on wheels 100. By means of a shaft 101, the frame may be coupled to a tractor (not shown), which may move the pick-up baler over a field.

The pick-up unit 1 may consist of a known rotating cylinder with tines 103 extending through slots 99 of a sheet metal cover 102. The baler unit P is arranged longitudinally in the direction of travel alongside the pick-up unit 1. A plunger K, shown in dotted lines in Fig. 2, is arranged for reciprocating movement in the baling chamber in a manner known per se. In side wall P' of the baler an opening 5 serves as feed-in opening for the crop material, to be moved into the baler and to a position in front of the plunger. For that purpose, packer fingers 6 are arranged above the feed-in opening 5 and attached to the top wall of baler P. Fingers 6 are mounted on crank arms 105 (Fig. 2) and are secured by arms 106 to a rod 107, which in turn is pivotally arranged between vertical walls 108 on a shaft 109 and is movable axially with respect thereto against the action of a spring 110.

The crank arms 105 are likewise pivotally mounted in walls 108 and are driven by a Cardan shaft 111 via a bevel gear 112 from a crank shaft 113 which imparts reciprocating movement to the plunger in baler P. Shaft 113 may be driven from a shaft of the tractor means (not shown) moving the entire machine over the field. An intermediate shaft 114 makes the connection with that drive and, in turn, drives shaft 113 by means of belt 115.

Fingers 6, moved over a curved path by means of crank arms 105, pass through slots 116 in the top wall of baling chamber P, said slots being open toward the feed-in opening 5, and gripping the crop material fed to opening 5 by a cross conveyer 7, push it into the baler chamber to the front of the plunger while the latter is on its return stroke and leaves the opening 5 entirely free.

Fingers 6 are then pulled back by means of crank arms 105 which move them through slots 116 and out of the baling chamber, so as to return them to their starting position shown in Fig. 1. Such fingers and mechanism for moving them as described are known in the art.

Tangentially adjacent to pick-up unit 1, an accumulating table 2 is arranged which has a vertical back wall 3 opposite to the pick-up unit 1. In Fig. 1 this wall is partly broken off, in order to show the cross conveyor more clearly. As shown in Figs. 1 and 2, a conveyer belt 7 is arranged behind wall 3; the belt is mounted on rollers 117 and 118 which are rotatable on vertical axes 119 and 120, respectively.

The belt carries fingers 4, which, in the embodiment shown in Fig. 2, are obliquely arranged with respect to wall 3 in such a way that upon their feed movement when they pass through horizontal slots 121 and 122 in wall 3 and extend over table 2 while travelling toward opening 5 of baler P, they will gradually disappear behind wall 3, so that no means is necessary for retracting them behind the wall. Also, they may be directly and rigidly attached to conveyer belt 7. The rotating pick-up tines 103 of unit 1 press the crop material lifted onto table 2 against wall 3 and spear it on fingers 4 which in their travel then pass it on to packer fingers 6.

Only packer fingers 6 have to be timed in accordance with the stroke of the plunger, since they can only move into the baling chamber when the plunger does not block the inlet opening. On the other hand, the cross conveyer 7, with fingers 4 may move at any desired speed independent from the stroke of the plunger. This is why the conveyer 7 may be a belt of leather or rubber so that feed fingers 4 are capable of giving way to any obstacle such as foreign bodies in the crop material, although they are made of unyielding material and are rigidly attached attached to the belt. This fact has been illustrated in Fig. 2, lefthand side, where one pair of feed fingers pushed out of normal position is shown in dotted lines.

A pair of feed fingers 4 may consist of a U-shaped piece, as shown in Fig. 1 where such a pair of fingers is shown having attachment tongues 4a.

The conveyer 7 may be driven from the shaft 123 of cranks 105 of packer finger 6 e.g. as shown particularly in Fig. 2 in the following manner:

On shaft 123 a sprocket wheel 124 is secured which drives by means of chain 125 a sprocket wheel 126, the shaft 127 of which drives by means of a bevel gear 128 the shaft 120 of roller 118 of the conveyer belt.

In order to tension the conveyer belt 7, the shaft 119 of the return roller 117 is supported in bearing 129 which in turn are slidably mounted in a support 130 by means of a screw-bolt 131 and can be locked by nuts 132.

What I claim is:

In a pick-up baler of the type having a pick-up unit, an accumulating table for crop material lifted thereon by said pick-up unit, a baling chamber having an inlet opening in a vertical wall thereof adjacent to one end of said table, a plunger for reciprocating movement in said baling chamber, and packer fingers with associated mechanism for moving them out of and into said opening of the baling chamber, thereby pushing said crop material under precompression into said baling chamber and in front of said plunger, in combination, a vertical damming wall with at least one slot therein, said wall being vertically arranged and extending over the entire length of said table opposite said pick-up unit and adjacent to a vertical edge of the inlet opening of said baling chamber, a conveyer belt movably mounted behind said vertical damming wall, feed finger means on said conveyer belt capable of reaching in its conveying stroke from a position in front of the wall and along the same toward said inlet opening, returning into starting position behind said wall, mounting means for said conveyer belt having two spaced vertical rollers behind said wall, the one of said rollers at the far end with respect to the baling chamber being located in close proximity to said back wall and the other of said rollers being located at a considerable distance therefrom, whereby said conveyer is obliquely arranged with respect to said wall, said slot being horizontally disposed, said finger means comprising a plurality of feed fingers rigidly attached to said conveyer belt in the height of the slot in said wall, drive means for continuously driving said belt, said feed fingers being moved by said conveyer to enter the slot in said wall so as to project over the table transversely a considerable depth thereon and to gradually disappear behind the wall during the travel over said table in the direction toward the inlet opening.

References Cited in the file of this patent

UNITED STATES PATENTS

| | | |
|---|---|---|
| 645,851 | Hebert | Mar. 20, 1900 |
| 1,960,594 | Patterson | May 29, 1934 |
| 2,038,809 | Tallman et al. | Apr. 28, 1936 |
| 2,378,107 | Russell | June 12, 1945 |
| 2,450,082 | Crumb et al. | Sept. 28, 1948 |
| 2,507,540 | Nolt | May 16, 1950 |
| 2,608,929 | Paradise et al. | Sept. 2, 1952 |
| 2,725,009 | Bornzin | Nov. 29, 1955 |
| 2,796,722 | Hanford et al. | June 25, 1957 |

FOREIGN PATENTS

| | | |
|---|---|---|
| 496,143 | Canada | Sept. 15, 1953 |
| 707,594 | Great Britain | Apr. 21, 1954 |